US009338248B2

(12) United States Patent
Fischer

(10) Patent No.: US 9,338,248 B2
(45) Date of Patent: May 10, 2016

(54) PARAMETER DRIVEN VALUE CONVERSION FRAMEWORK IN CLIENT/SERVER ARCHITECTURES

(75) Inventor: Martin Fischer, Heidelberg (DE)

(73) Assignee: SAP SE, Walldorf (DE)

( * ) Notice: Subject to any disclaimer, the term of this patent is extended or adjusted under 35 U.S.C. 154(b) by 100 days.

(21) Appl. No.: 13/327,711

(22) Filed: Dec. 15, 2011

(65) Prior Publication Data

US 2013/0159551 A1 Jun. 20, 2013

(51) Int. Cl.
G06F 15/16 (2006.01)
H04L 29/08 (2006.01)
H04L 29/06 (2006.01)

(52) U.S. Cl.
CPC ............ *H04L 67/2823* (2013.01); *H04L 69/08* (2013.01)

(58) Field of Classification Search
CPC ....................................................... H04L 69/08
USPC ......................................................... 709/246
See application file for complete search history.

(56) References Cited

U.S. PATENT DOCUMENTS

| 5,781,743 | A   | * | 7/1998 | Matsuno et al. | 709/228 |
| 2003/0041124 | A1 | * | 2/2003 | Navarre et al. | 709/219 |
| 2005/0149552 | A1 | * | 7/2005 | Chan et al. | 707/102 |
| 2005/0204055 | A1 | * | 9/2005 | Martinez et al. | 709/232 |
| 2006/0017947 | A1 | * | 1/2006 | Wang et al. | 358/1.13 |
| 2006/0031580 | A1 | * | 2/2006 | Kim | 709/246 |
| 2007/0073899 | A1 | * | 3/2007 | Judge et al. | 709/246 |
| 2007/0127555 | A1 | * | 6/2007 | Lynch | 375/142 |
| 2008/0082690 | A1 | * | 4/2008 | Landry et al. | 709/246 |
| 2009/0049146 | A1 | * | 2/2009 | Okita et al. | 709/206 |

* cited by examiner

*Primary Examiner* — Hamza Algibhah
(74) *Attorney, Agent, or Firm* — Mintz Levin Cohn Ferris Glovsky and Popeo, P.C.

(57) ABSTRACT

A system and method for parameter-driven value conversion in a client/server architecture is presented. A request is received from a client computer for an application service. The request includes a parameter defining a data field for a conversion and a conversion ID that specifies the conversion. A lookup is performed of a converter in a conversion registry based on the conversion ID, and the converter is then called to perform the conversion of the data field defined by the parameter in the request, to generate a converted data field. Finally, the converted data field is returned to the protocol handler.

17 Claims, 3 Drawing Sheets

PARAMETER DRIVEN VALUE CONVERSION FRAMEWORK IN CLIENT/SERVER ARCHITECTURES

TECHNICAL FIELD

The subject matter described herein relates to client/server computing, and more particularly to a parameter-driven value conversion framework in client/server architectures.

BACKGROUND

In a client server architecture there is often the demand to convert business data values from an internal server side representation into an external client side representation and inversely. A simple example of such data is a date like 08/17/2011, which could have an internal format 20110817 and multiple possible external formats such as 17.08.2011 (or others that are not based on the Gregorian calendar). Note that the representation could depend on the region from which the service is called. Other examples include timestamps, status codes, etc.

Current server applications expose the data values of structured business data in a fixed representation, often even in an internal but non-human readable format. A common solution to this problem is to implement some logic in the client to adjust this data representation to a desired format. In the emerging technology of mobile business scenarios, there are more and more clients that will be used "out of the box" and where the consumer of a service has no control over the client implementation. Thus there is a growing need to shift the control over the data values into the service calls and to enable the clients to be configured differently for the client side value representation.

Accordingly, what is needed is a solution to have client side control over the data values exposed by a consumed service.

SUMMARY

In one aspect, a computer-implemented method is disclosed. The method includes receiving, by a protocol handler of a server computer, a request from a client computer for an application service. The request includes a parameter defining a data field for a conversion and a conversion ID that specifies the conversion. The method further includes performing, by a conversion handler associated with the protocol handler, a lookup of a converter in a conversion registry based on the conversion ID. The method further includes calling, by the conversion handler, the converter to perform the conversion of the data field defined by the parameter in the request, to generate a converted data field, returning the converted data field to the protocol handler.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

Implementations of the current subject matter can provide one or more advantages. For example, the system and method described herein allows further using out of the box clients and supports better decoupling of service and client applications.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

To address these and potentially other issues with currently available solutions, methods, systems, articles of manufacture, and the like consistent with one or more implementations of the current subject matter can, among other possible advantages, provide a parameter-driven value conversion framework in client/server architectures.

In accordance with various implementations, introduces a new parameter is introduced to control data value conversions in the protocol layer between the client and server. In this parameter, names of various fields to be converted and a unique conversion ID are passed in tuples from client to server. These parameter values are evaluated on the server, and the conversion routines defined by the conversion Id are processed for the field values defined by the passed field names.

Figure 1:
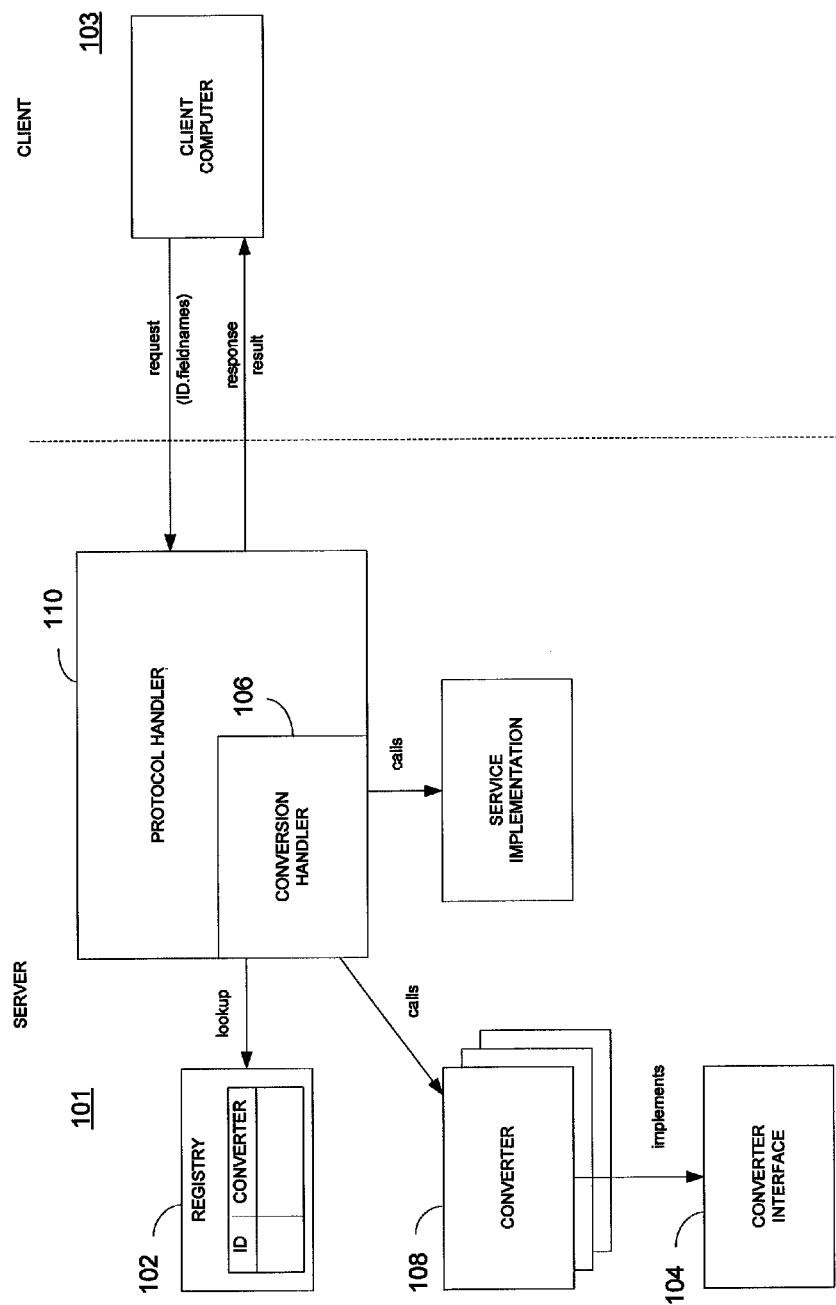
FIG. 1 is a diagram illustrating aspects of a system showing features consistent with implementations of the current subject matter.

FIG. 1 illustrates a conversion framework 100 of a client/server architecture of one or more servers 101 communicating with one or more clients 103. The conversion framework 100 includes a conversion registry 102, a converter interface 104, a conversion handler 106, and a data converter 108.

Conversion IDs are stored together in the conversion registry 102 with the corresponding conversion modules that execute a conversion from an internal server-side value representation into external client-side representation, and conversely. Calculation of the conversions is performed by the converter interface 104, which defines the modules and signature for the conversions. Accordingly, the framework is extensible for new conversions that can be registered under a unique conversion ID in the conversion registry 102.

The conversion handler 106 communicates with a central protocol handler 110, which is the central point of the server 101 where incoming requests from, and outgoing responses of the protocol to the client 103 are processed. Incoming parameters and values are passed to the protocol handler 110, which passes the request to a service implementation 112, which implements the requested service to generate outgoing result data. The outgoing data is centrally passed by the protocol handler 110 to the conversion handler 106. The conversion handler 106 looks up the conversion modules in the conversion registry 102 with the passed conversion IDs, and triggers these converter modules 108 for the converter interface 104 to calculate the converted values for the past field names.

Figure 2:
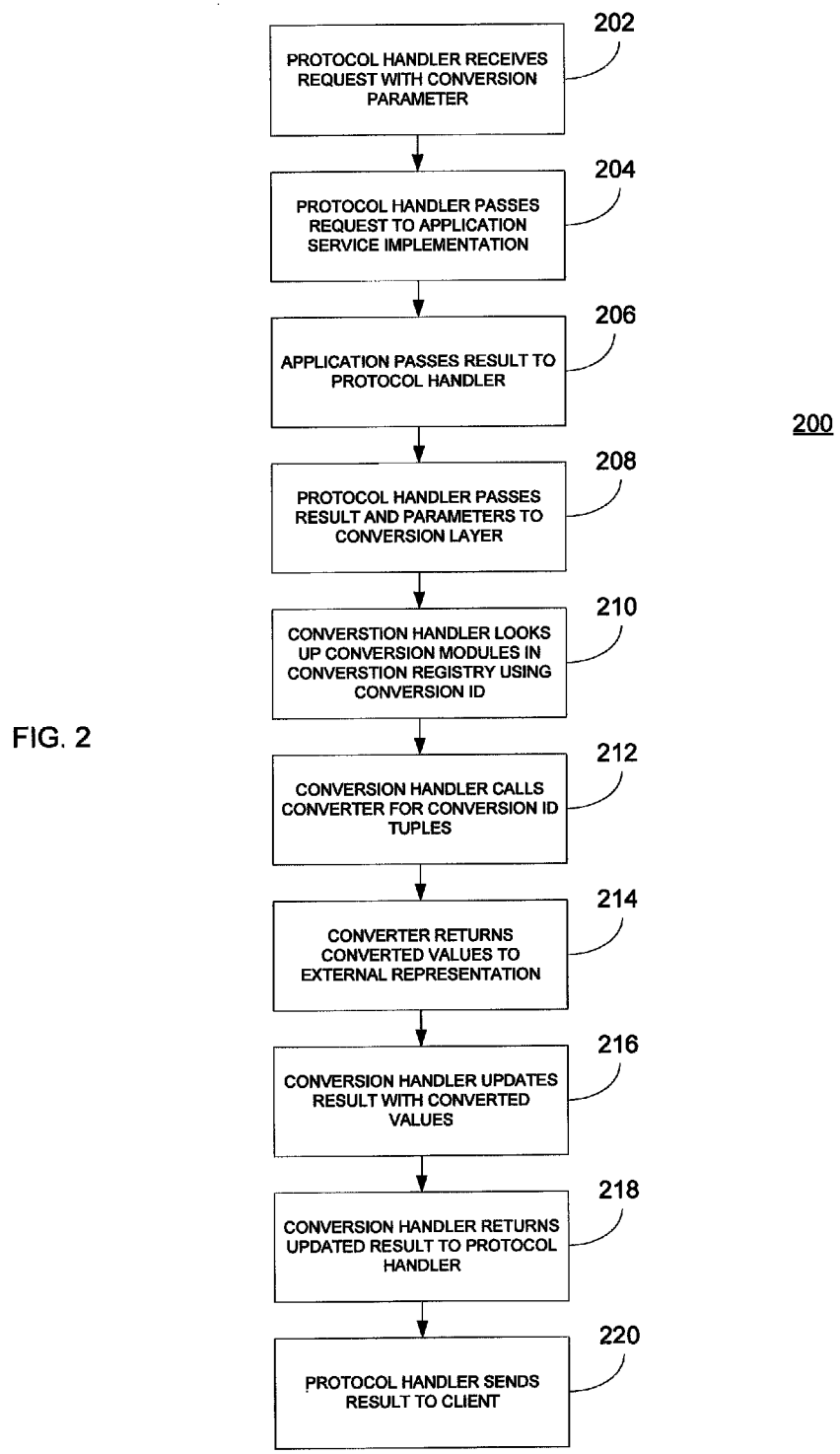
FIG. 2 is a process flow diagram illustrating aspects of a method having one or more features consistent with implementations of the current subject matter.

FIG. 2 illustrates a read access process 200 of a conversion framework, e.g., when requested application service is performed before data values are converted to an external representation. At 202, the protocol handler of a server receives a request from a client for an application service. The request includes a conversion parameter. At 204, the protocol handler passes the request to a service implementation of the application, which implements the service requested by the request. At 206, the service implementation of the application passes the result of the requested service to the protocol handler.

At 208, the protocol handler passes the result and associated parameters to a conversion layer or framework associated with the server, and in particular to a conversion handler associated with the protocol handler. At 210, the conversion handler executes a lookup for conversion modules stored in a conversion registry, using a conversion ID as part of the parameters associated with the result. At 212, one or more converters, or conversion modules, are called, preferably by the conversion handler and based on the lookup in the conversion registry. At 214, each of the one or more converters converts a value associated with the result to a value corresponding to an external representation, i.e., a representation used by the client or client environment.

At 216, the conversion handler updates the result with the converted value(s), and at 218, returns the updated result to the protocol handler, preferably that handled the initial request. At 220, the protocol handler sends the result, with the updated and converted value(s), to the client to fulfill the request and provide the requested result using a representation for at least some data values that are specific to the client or the client environment.

Figure 3:
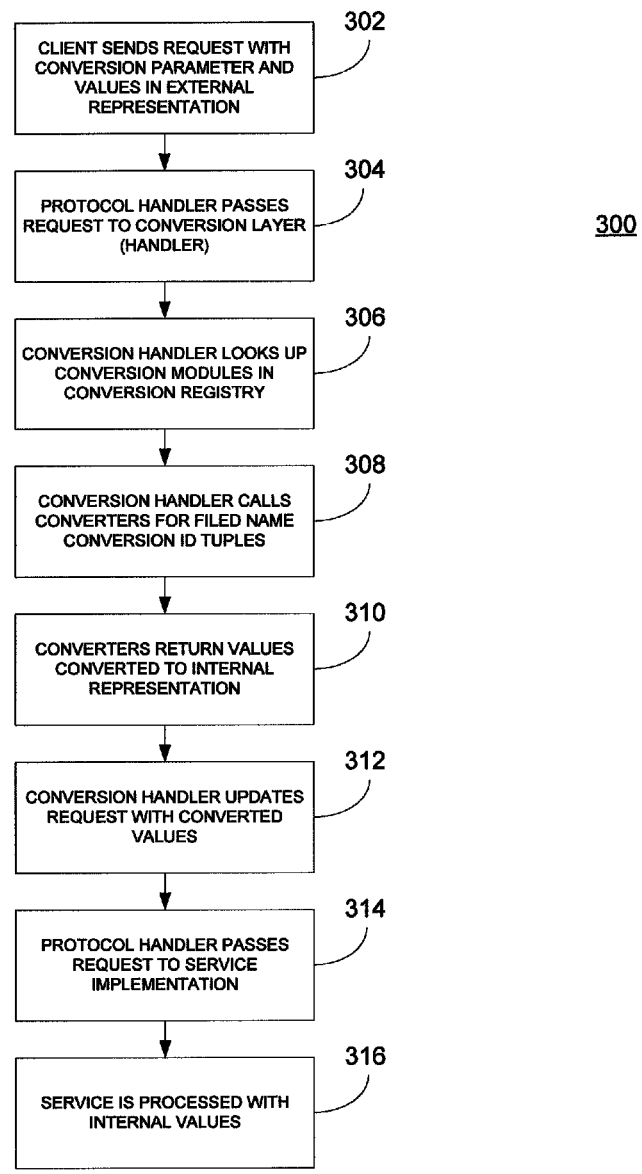
FIG. 3 is a process flow diagram illustrating other aspects of a method having one or more features consistent with implementations of the current subject matter.

FIG. 3 illustrates a write access process 300 of a conversion framework, e.g., when requested application service is performed after data values are converted from an external representation to an internal representation. At 302, a client sends a request to a protocol handler. The request includes a parameter and values in an external representation, i.e. a representation used by the client or in the client environment. At 304, the protocol handler passes the request to a conversion handler of a conversion layer.

At 306, the conversion handler performs a lookup of one or more converters, or conversion modules, in a conversion registry, based at least in part on conversion IDs associated with the parameters. At 308, the conversion handler calls the converters for filed name conversion ID tuples, to execute a conversion routine on the associated data values. By 310, each of the called converters returns values converted into an internal representation, i.e. a representation used by the server or server environment.

At 312, the conversion handler updates the request with the converted values, and passes the updated request to the protocol handler. At 314, the protocol handler passes the updated request to the service implementation to execute the service requested by the request from the client. At 316, the requested application service is processed with the internal values, or the converted values from the external representation of the data values in the initial request from the client.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
   receiving, by a protocol handler of a server computer, a request from a client computer for an application service, the request including a parameter defining a data field of a plurality of data fields for a conversion and a conversion identifier that specifies the conversion;
   performing, by a conversion handler associated with the protocol handler, a lookup of a converter of a plurality of converters in a conversion registry based on the conversion identifier, each data field of the plurality of data fields being associated with a different converter of the plurality of converters, the conversion registry storing data associated with the plurality of converters, the conversion registry being extensible for one or more new conversions associated with respective data fields, the conversion handler configured to look up one or more converters associated with the one or more new conversions in the conversion registry, each converter of the plurality of converters configured to convert a corresponding data field from one format to another format that is different for each converter;
   calling, by the conversion handler, the converter to perform the conversion of the data field defined by the parameter in the request, to generate a converted data field, the converter operably coupled to a conversion interface that is separate from the converter and that executes the conversion of the data field;
   updating, by the conversion handler, the request with the converted data field; and
   passing, by the conversion handler, the updated request to the protocol handler.

2. The computer-implemented method in accordance with claim 1, wherein the conversion comprises converting the data field from an internal representation used by the server computer to an external representation used by the client computer.

3. The computer-implemented method in accordance with claim 1, wherein the conversion comprises converting the data field from an external representation used by the client computer to an internal representation used by the server computer.

4. The computer-implemented method in accordance with claim 1, wherein the request includes the data field.

5. The computer-implemented method in accordance with claim 1, wherein the request includes a request for the data field from the server computer.

6. The computer-implemented method in accordance with claim 1, further comprising sending, from the protocol handler of the server computer, a result using the converted data field to the client computer in response to the request.

7. The computer-implemented method in accordance with claim 6, wherein the result includes the converted data field.

8. A computer program product comprising a non-transitory machine-readable medium storing instructions that, when executed by at least one programmable processor, cause the at least one programmable processor to perform operations comprising:
   receive a request from a client computer for an application service, the request including a parameter defining a data field of a plurality of data fields for a conversion and a conversion identifier that specifies the conversion;
   perform a lookup of a converter of a plurality of converters in a conversion registry based on the conversion identifier, each data field of the plurality of data fields being associated with a different converter of the plurality of converters, the conversion registry storing data associated with the plurality of converters, each converter of the plurality of converters configured to convert a corresponding data field from one format to another format that is different for each converter;
   call the converter to perform the conversion of the data field defined by the parameter in the request;
   generate, by a conversion interface implemented by the converter, a converted data field from the conversion;
   update, by the conversion handler, the request with the converted data field; and
   pass, by the conversion handler, the updated request to the protocol handler.

9. The computer program product in accordance with claim 8, wherein the conversion comprises converting the data field from an internal representation used by the server computer to an external representation used by the client computer.

10. The computer program product in accordance with claim 9, wherein the conversion comprises converting the data field from an external representation used by the client computer to an internal representation used by the server computer.

11. The computer program product in accordance with claim 10, wherein the request includes the data field.

12. The computer program product in accordance with claim 8, wherein the request includes a request for the data field from the server computer.

13. A computer program product in accordance with claim 8, wherein the instructions further cause the at least one programmable processor to:
   send a result using the converted data field to the client computer in response to the request.

14. The computer program product in accordance with claim 13, wherein the result includes the converted data field.

15. A system comprising:
   a protocol handler, implemented by one or more processors, for receiving a request from a client computer for an application service, the request including a parameter defining a data field of a plurality of data fields for a conversion and a conversion identifier that specifies the conversion;

a conversion registry for storing a plurality of converters according to a plurality of conversion identifiers, each data field of the plurality of data fields associated with a separate converter of the plurality of converters, each converter of the plurality of converters configured to convert a corresponding data field from one format to another format that is different for each converter;

a conversion handler associated with the protocol handler and implemented by one or more processors, the conversion handler configured for performing a lookup of a converter of the plurality of converters in the conversion registry based on the conversion identifier in the request, the conversion handler further configured for calling at least one of the one or more converters; and a conversion interface for executing the conversion of the data field defined by the parameter in the request by the at least one of the one or more converters, the conversion of the data field generating a converted data field, the conversion interface updating the request with the converted data field, the conversion interface passing the updated request to the protocol handler.

16. The computer-implemented method of claim 1, wherein the conversion handler is configured to call the one or more converters associated with the one or more new conversions, the one or more converters configured to convert the one or more data fields associated with the one or more new conversions from one or more internal representations used by the server computer to one or more external representations used by the client computer.

17. The computer-implemented method in accordance with claim 1, wherein the plurality of converters is executed on a hardware device that is separate from another hardware device executing the protocol handler.

* * * * *